(12) United States Patent
Cho et al.

(10) Patent No.: US 8,498,239 B2
(45) Date of Patent: Jul. 30, 2013

(54) METHOD FOR MAPPING A SUBBAND/MINIBAND IN A WIRELESS COMMUNICATION SYSTEM, AND APPARATUS FOR THE SAME

(75) Inventors: Han Gyu Cho, Anyang-si (KR); Seung Hyun Kang, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/203,920

(22) PCT Filed: Mar. 2, 2010

(86) PCT No.: PCT/KR2010/001280
§ 371 (c)(1),
(2), (4) Date: Aug. 30, 2011

(87) PCT Pub. No.: WO2010/101385
PCT Pub. Date: Sep. 10, 2010

(65) Prior Publication Data
US 2011/0310835 A1 Dec. 22, 2011

Related U.S. Application Data

(60) Provisional application No. 61/156,812, filed on Mar. 2, 2009.

(51) Int. Cl.
*H04B 7/212* (2006.01)
(52) U.S. Cl.
USPC .......................................................... 370/322
(58) Field of Classification Search
USPC .................. 370/310, 315, 316, 319, 321, 322, 370/328, 329, 343, 344, 464, 480; 455/403, 455/422.1, 455
See application file for complete search history.

(56) References Cited

U.S. PATENT DOCUMENTS

2009/0262696 A1* 10/2009 Wei et al. ...................... 370/329
2010/0312894 A1* 12/2010 Awad et al. ................... 709/226

FOREIGN PATENT DOCUMENTS

| KR | 10-2006-0057937 A | 5/2006 |
| KR | 10-2006-0097450 A | 9/2006 |
| KR | 10-2007-0043983 A | 4/2007 |
| KR | 10-2008-0086317 A | 9/2008 |

OTHER PUBLICATIONS

IEEE 802.16m-08/050 (InterDigital Communications, LLC) Dec. 11, 2008. See pp. 23-25 (downloaded Aug. 30, 2011).

* cited by examiner

*Primary Examiner* — Obaidul Huq
(74) *Attorney, Agent, or Firm* — McKenna Long & Aldridge LLP (57) ABSTRACT

The present application discloses a method for mapping a subband/miniband in a wireless communication system. Particularly, the method comprises the steps of: dividing a system frequency band into a plurality of physical resource units (PRU); mapping the plurality of physical resource units to physical resource units of a subband (PRUSB) in accordance with a $1^{st}$ rule; and mapping the plurality of physical resource units to physical resource units of a miniband (PRUMB) in accordance with a $2^{nd}$ rule, wherein said $1^{st}$ rule and said $2^{nd}$ rule contain factors for limiting the minimum value of the gap between subbands allocated to the system frequency band.

14 Claims, 8 Drawing Sheets

METHOD FOR MAPPING A SUBBAND/MINIBAND IN A WIRELESS COMMUNICATION SYSTEM, AND APPARATUS FOR THE SAME

This application is a 35 U.S.C. §371 National Stage entry of International Application No. PCT/KR2010/001280, filed on Mar. 2, 2010, and claims the benefit of priority of U.S. Provisional Application No. 61/156,812, filed Mar. 2, 2009, both of which are hereby incorporated by reference in their entirety as if fully set forth herein.

TECHNICAL FIELD

The present invention relates to a wireless communication system and, more particularly, to a method for mapping a subband/miniband in a wireless communication system and an apparatus for the same.

BACKGROUND ART

Figure 1:
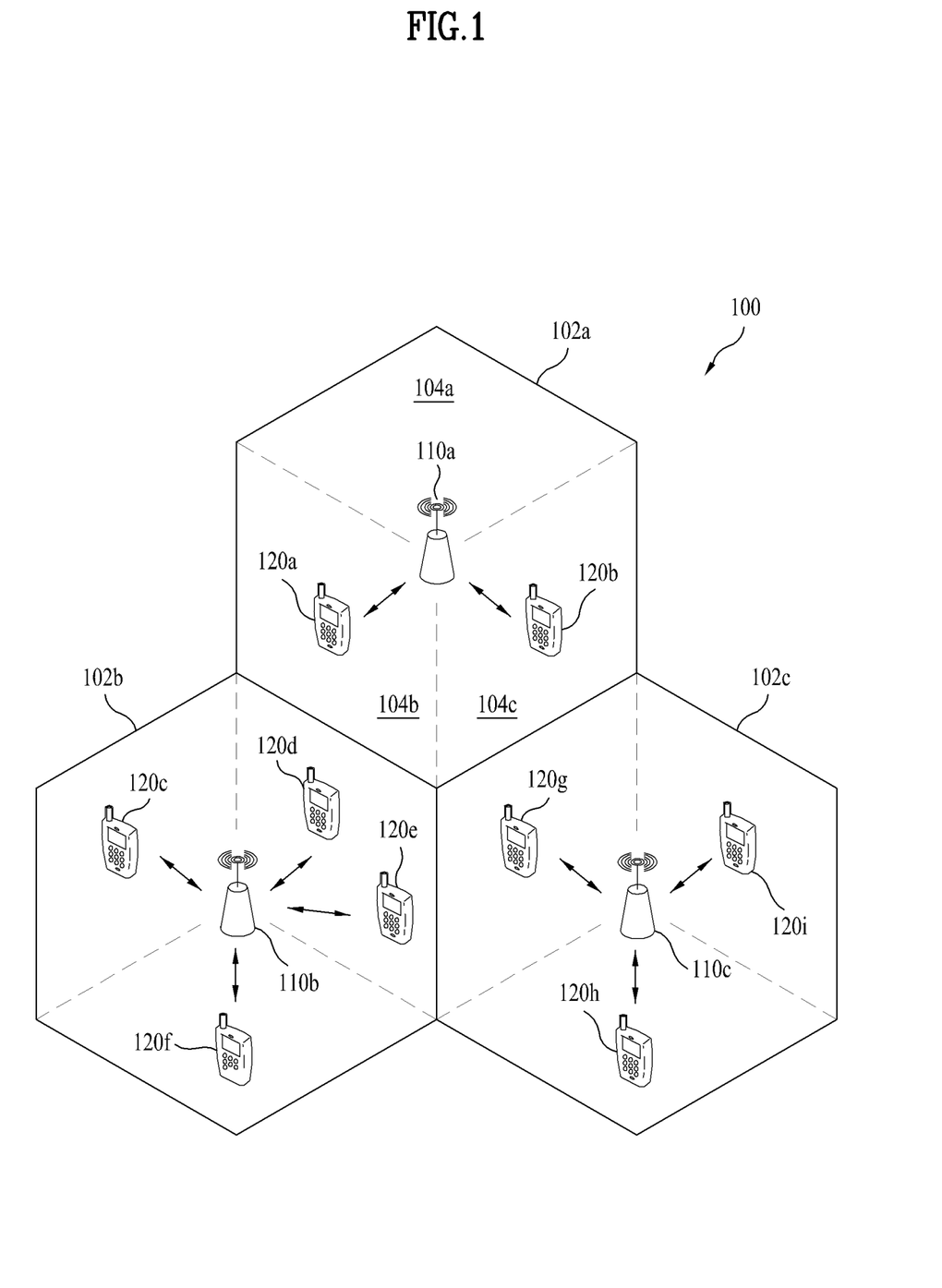
FIG. 1 is a diagram showing a wireless communication system.

FIG. 1 shows a wireless communication system. Referring to FIG. 1, a wireless communication system 100 includes a plurality of base stations and a plurality of terminals 120. The wireless communication system 100 may include a homogeneous network or a heterogeneous network. The heterogeneous network refers to a network in which different network entities such as a macro cell, a femto cell, a pico cell and a relay node coexist. A base station is generally a fixed station which communicates with a terminal and base stations 110a, 110b and 110c respectively provide services to specific geographical areas 102a, 102b and 102c. In order to improve system performance, the specific area may be divided into a plurality of sub areas 104a, 104b and 104c. The sub area may be referred to as a cell, a sector or a segment. In case of an Institute of Electrical and Electronics Engineers (IEEE) 802.16 system, a cell identity is allocated based on the entire system. In contrast, a sector or segment identity is allocated based on a specific area in which each base station provides a service and has a value of 0 to 2. Terminals 120 are generally distributed in a wireless communication system and may be fixed or mobile. Each terminal may communicate with one or more base stations at a certain time in uplink and downlink. The base station and the terminal may perform communication using Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA) or a combination thereof. In the present specification, the uplink refers to a communication link from a terminal to a base station and the downlink refers to a communication link from a base station to a terminal.

DISCLOSURE

Technical Problem

An object of the present invention is to provide a method for mapping a subband/miniband in a wireless communication system and an apparatus for the same.

The technical problems solved by the present invention are not limited to the above technical problems and those skilled in the art may understand other technical problems from the following description.

Technical Solution

The object of the present invention can be achieved by providing a method for mapping a system frequency band to subbands and minibands at a base station in a wireless communication system, including dividing the system band frequency into a plurality of physical resource units (PRUs), mapping the plurality of PRUs to physical resource units of a subband $PRU_{SB}$ in accordance with a first rule, mapping the plurality of physical resource units to physical resource units of a miniband $PRU_{MB}$ in accordance with a second rule, wherein the first rule and the second rule contain factors for limiting a maximum value of a gap between subbands allocated to the system frequency band.

The first rule may be $PRU_{SB}[j]=PRU[i]$, $j=0, 1, \ldots, L_{SB}-1$, where i is $$N_1 \cdot \left\{ \left\lceil \frac{N_{sub}}{\max(K_{SB}, x)} \right\rceil \cdot \left\lfloor \frac{j}{N_1} \right\rfloor + \left\lfloor \frac{j}{N_1} \right\rfloor \cdot \frac{GCD(N_{sub}, \lceil N_{sub}/\max(K_{SB}, x)\rceil)}{N_{sub}} \right\} \bmod\{N_{sub}\} + \{j\}\bmod\{N_1\}$$

(where, $N_1$ denotes the number of physical resource units configuring one subband, $N_{sub}$ denotes a maximum number of subbands, $K_{SB}$, denotes the number of subbands to be allocated, GCD(a, b) denotes a greatest common divisor of a and b, and x denotes a factor for limiting a maximum value of a gap between subbands).

The second rule may be
$PRU_{MB}[k]=PRU[i]$, $k=0, 1, \ldots, L_{MB}-1$, where i is $$\begin{cases} N_1 \cdot \left\{ \left\lceil \frac{N_{sub}}{\max(K_{SB}, x)} \right\rceil \cdot \left\lfloor \frac{k+L_{SB}}{N_1} \right\rfloor + \left\lfloor \frac{k+L_{SB}}{N_1} \right\rfloor \cdot \frac{GCD(N_{sub}, \lceil N_{sub}/\max(K_{SB}, x)\rceil)}{N_{sub}} \right\} \bmod\{N_{sub}\} + \{k+L_{SB}\}\bmod\{N_1\} & K_{SB} > 0 \\ k & K_{SB} = 0 \end{cases}$$

(where, $N_1$ denotes the number of physical resource units configuring one subband, $N_{sub}$ denotes a maximum number of subbands, $K_{SB}$, denotes the number of subbands to be allocated, GCD(a, b) denotes a greatest common divisor of a and b, x denotes a factor for limiting a maximum value of a gap between subbands, and $L_{SB}$, denotes the number of physical resource units included in allocated subbands).

The factor x for limiting the maximum value of the gap between the subbands may be 3 or 4.

The number $K_{SB}$, of subbands to be allocated may be included in a downlink subband allocation count (DSAC) field, and the downlink subband allocation count field may be broadcast through a super frame header.

The method may further include performing permutation with respect to the mapped physical resource units $PRU_{MP}$ of the subband.

In another aspect of the present invention, there is provided a base station apparatus including a processor configured to divide the system band frequency into a plurality of physical resource units (PRUs), map the plurality of PRUs to physical resource units of a subband $PRU_{SB}$ in accordance with a first rule, and map the plurality of physical resource units to physical resource units of a miniband $PRU_{MB}$ in accordance with a second rule, and a transmission module configured to transmit a downlink signal to a terminal using the physical resource units of the subband and the physical resource units of the miniband, wherein the first rule and the second rule contain factors for limiting a maximum value of a gap between subbands allocated to the system frequency band.

The first rule may be $PRU_{SB}[j]=PRU[i]$, $j=0, 1, \ldots, L_{SB}-1$, where i is $$N_1 \cdot \left\{ \left[ \left\lceil \frac{N_{sub}}{\max(K_{SB}, x)} \right\rceil \cdot \left\lfloor \frac{j}{N_1} \right\rfloor \right] + \left[ \left\lfloor \frac{j}{N_1} \right\rfloor \cdot \frac{GCD(N_{sub}, \lceil N_{sub}/\max(K_{SB}, x) \rceil)}{N_{sub}} \right] \right\} \bmod\{N_{sub}\} + \{j\} \bmod\{N_1\}$$

(where, $N_1$ denotes the number of physical resource units configuring one subband, $N_{sub}$ denotes a maximum number of subbands, $K_{SB}$ denotes the number of subbands to be allocated, GCD(a, b) denotes a greatest common divisor of a and b, and x denotes a factor for limiting a maximum value of a gap between subbands).

The second rule may be $PRU_{MB}[k]=PRU[i]$, $k=0, 1, \ldots, L_{MB}-1$, where i is $$\begin{cases} N_1 \cdot \left\{ \left[ \left\lceil \frac{N_{sub}}{\max(K_{SB}, x)} \right\rceil \cdot \left\lfloor \frac{k+L_{SB}}{N_1} \right\rfloor \right] + \left[ \left\lfloor \frac{k+L_{SB}}{N_1} \right\rfloor \cdot \frac{GCD(N_{sub}, \lceil N_{sub}/\max(K_{SB}, x) \rceil)}{N_{sub}} \right] \right\} \bmod\{N_{sub}\} + \{k+L_{SB}\} \bmod\{N_1\} & K_{SB} > 0 \\ k & K_{SB} = 0 \end{cases}$$

(where, $N_1$ denotes the number of physical resource units configuring one subband, $N_{sub}$ denotes a maximum number of subbands, $K_{SB}$, denotes the number of subbands to be allocated, GCD(a, b) denotes a greatest common divisor of a and b, x denotes a factor for limiting a maximum value of a gap between subbands, and $L_{SB}$, denotes the number of physical resource units included in allocated subbands).

The factor x for limiting the maximum value of the gap between the subbands may be 3 or 4.

The number $K_{SB}$, of subbands to be allocated may be included in a downlink subband allocation count (DSAC) field, and the downlink subband allocation count field may be broadcast through a super frame header.

The processor may perform permutation with respect to the mapped physical resource units $PRU_{MP}$ of the subband.

Advantageous Effects

According to the embodiments of the present invention, it is possible to efficiently obtain diversity gain of minibands after mapping subband/minibands in an IEEE 802.16m system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a system using a plurality of orthogonal subcarriers. For convenience, although the present invention is described using an IEEE 802.16 system, the present invention is applicable to various wireless communication systems including a $3^{rd}$ Generation Partnership Project (3GPP).

Figure 2:
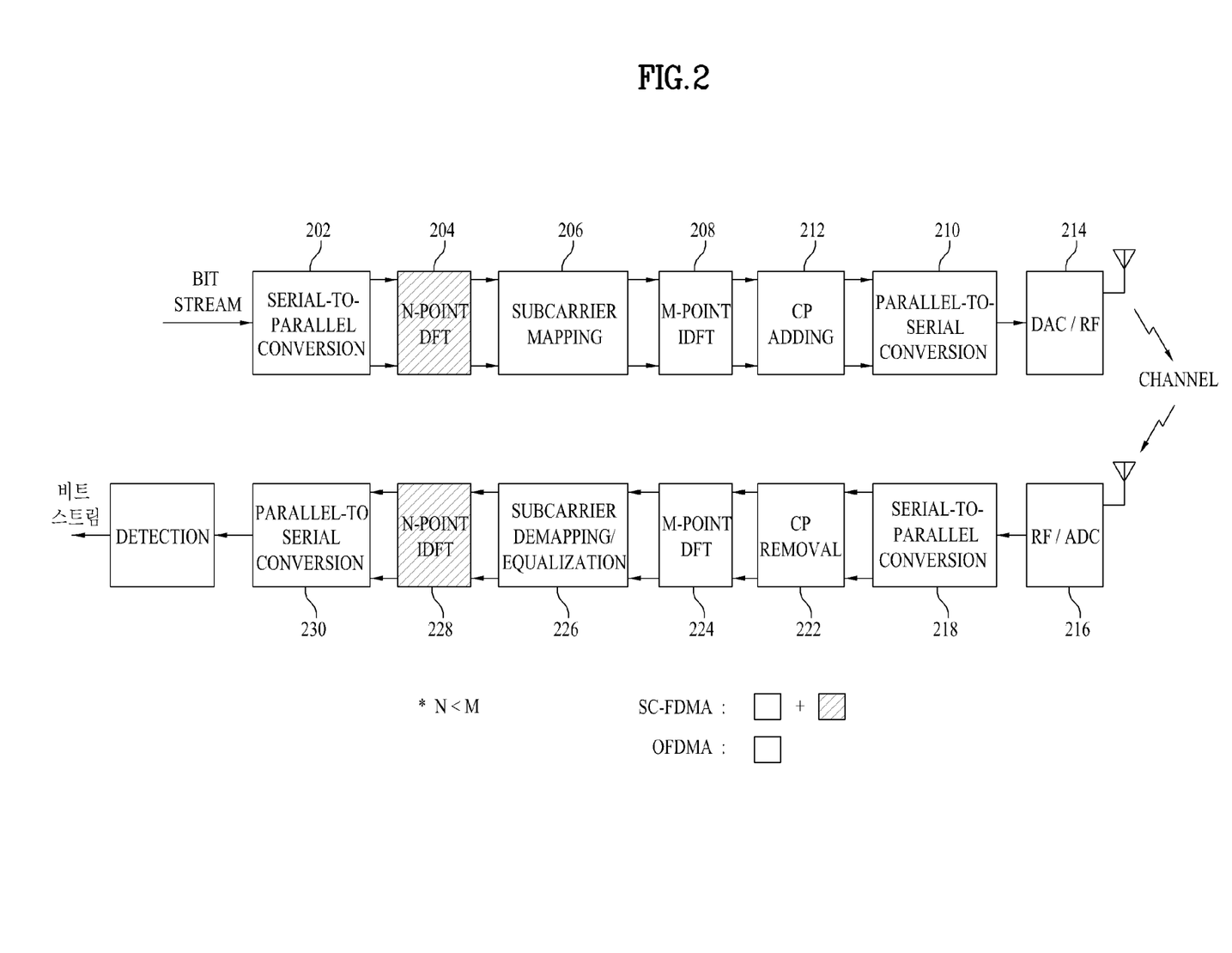
FIG. 2 is a block diagram showing a transmitter and a receiver for OFDMA and SC-FDMA.

FIG. 2 is a block diagram showing a transmitter and a receiver for OFDMA and SC-FDMA. In uplink, a transmitter may be a part of a terminal and a receiver may be a part of a base station. In downlink, a transmitter may be a part of a base station and a receiver may be a part of a terminal.

Referring to FIG. 2, an OFDMA transmitter includes a serial-to-parallel converter 202, a subcarrier mapping module 206, an M-point Inverse Discrete Fourier Transform (IDFT) module 208, a Cyclic Prefix (CP) adding module 210, a parallel-to-serial converter 212, and a Radio Frequency (RF)/Digital-to-Analog Converter (DAC) 214.

The OFDMA transmitter performs the following signal processing procedure. First, a bit stream is modulated into a data symbol sequence. The bit stream may be obtained by performing various signal processing procedures such as channel encoding, interleaving and scrambling with respect to a data block received from a Medium Access Control (MAC) layer. The bit stream is referred to as a codeword and is equivalent to a data block received from a MAC layer. The data block received from the MAC layer is referred to as a transport block. A modulation scheme includes, but is not limited to, Binary Phase Shift Keying (BPSK), Quadrature Phase Shift Keying (QPSK), and n-Quadrature Amplitude Modulation (n-QAM). Thereafter, a serial data symbol sequence is converted N data symbols by N data symbols (202). N data symbols are mapped to N subcarrier allocated among a total of M subcarriers and the remaining M-N subcarriers are padded with 0 (206). The data symbols mapped in the frequency domain are converted into a time domain sequence through an M-pint IDFT processing (208). Thereafter, in order to reduce inter-symbol interference or inter-carrier interference, a cyclic prefix (CP) is added to the time domain sequence so as to generate OFDMA symbols (210). The generated OFDMA symbols are parallel-to-serial converted (212). Thereafter, the OFDMA symbols are subjected to procedures such as digital-to-analog conversion and frequency up-conversion and are transmitted to the receiver (214). Available subcarriers out of the M-N subcarriers left after allocating the subcarriers to a user are allocated to another user. In contrast, the OFDMA receiver includes a RF/Analog-to-Digital Converter (ADC) module 216, a serial-to-parallel converter 218, a CP removal module 220, an M-point Discrete Fourier Transform (DFT) module 224, a subcarrier demapping/equalization module 226, a parallel-to-serial converter 228 and a detection module 230. A signal processing procedure of the OFDMA receiver is performed in inverse order of the signal processing procedure of the OFDMA transmitter.

An SC-FDMA transmitter further includes an N-point DFT module 204 in the previous stage of the subcarrier mapping module 206 as compared to the OFDMA transmitter. The SC-FDMA receiver spreads a plurality of pieces of data in a frequency domain through DFT before the IDFT processing, thereby remarkably reducing a Peak-to-Average Power Ratio (PAPR) of the transmitted signal as compared to the OFDMA scheme. The SC-FDMA receiver further includes an N-point IDFT module 228 in the next stage of the subcarrier demapping module 226, as compared to the OFDMA receiver. A signal processing procedure of the SC-FDMA receiver is performed in inverse order of the signal processing procedure of the SC-FDMA transmitter.

The modules shown in FIG. 2 are merely exemplary and the transmitter and/or the receiver may further include necessary modules, some modules/functions may be omitted or separated into different modules and two or more modules may be combined into one module.

Figure 3:
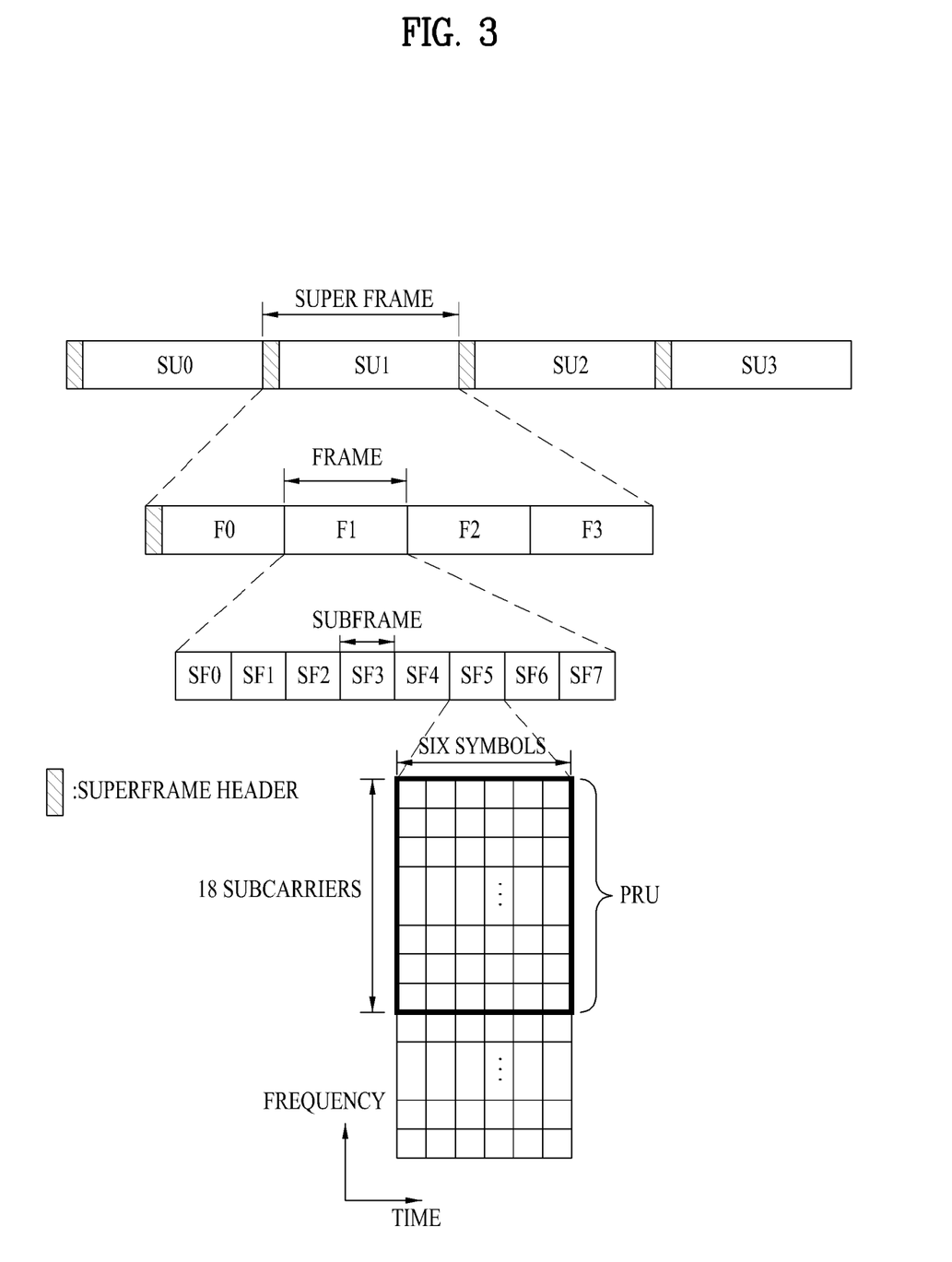
FIG. 3 is a diagram showing a radio frame structure of an IEEE 802.16m system.

FIG. 3 is a diagram showing a radio frame structure of an IEEE 802.16m system.

Referring to FIG. 3, a radio frame structure includes 20-ms super frames SU0 to SU3 supporting 5 MHz, 8.75 MHz, 10 MHz or 20 MHz. The super frame includes four 5-ms frames F0 to F3 having the same size and begins at a super frame header (SFH). The SFH carries essential system parameters and system configuration information.

The frame includes eight subframes SF0 to SF7. The subframe is allocated to downlink or uplink transmission. The subframe includes a plurality of OFDM symbols in a time domain and includes a plurality of subcarriers in a frequency domain. The OFDM symbol may be referred to as an OFDMA symbol, an SC-FDMA symbol, etc. according to a multiple access scheme. The number of OFDM symbols included in the subframe may be variously changed according to a channel bandwidth or a CP length.

The type of the subframe may be defined according to the number of OFDM symbols included in the subframe. For example, a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include the same type of subframes or different types of subframes.

The OFDM symbol includes a plurality of subcarriers and the number of subcarriers is determined according to the size of Fast Fourier Transform (FFT). The type of the subcarrier may be divided into a data subcarrier for data transmission, a pilot subcarrier for channel measurement and a null subcarrier for a guard band and a DC component. Parameters of the OFDM symbol includes BW, $N_{used}$, n, G, etc. BW is a nominal channel bandwidth. $N_{used}$ is the number of subcarriers used for signal transmission. n is a sampling factor and determines a subcarrier spacing and a useful symbol time along with BW and $N_{used}$. G is a ratio of CP time to useful time.

Table 1 shows an example of the OFDMA parameters.

TABLE 1

| The nominal channel bandwidth, BW (MHz) | | 5 | 7 | 8.75 | 10 | 20 |
|---|---|---|---|---|---|---|
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing. $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = 1/8 | OFDMA symbol time, $T_s$ (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| CP ratio, G = 1/16 | OFDMA symbol time, $T_s$ (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |
| CP ratio, G = 1/4 | OFDMA symbol time, $T_s$ (μs) | 114.286 | 160 | 128 | 114.286 | 114.286 |

TABLE 1-continued

|  |  |  |  |  |  |  |  |
|---|---|---|---|---|---|---|---|
|  | FDD | Number of OFDMA symbols per 5 ms frame | 43 | 31 | 39 | 43 | 43 |
|  |  | Idle time (μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG (μs) | 199.98 | 200 | 136 | 199.98 | 199.98 |
| Number of Guard Sub-Carriers | Left |  | 40 | 80 | 80 | 80 | 160 |
|  | Right |  | 39 | 79 | 79 | 79 | 159 |
| Number of Used Sub-Carriers |  |  | 433 | 865 | 865 | 865 | 1729 |
| Number of Physical Resource Unit (18 × 6) in a type-1 subframe. |  |  | 24 | 48 | 48 | 48 | 96 |

The subframe includes a plurality of physical resource units (PRUs) in a frequency domain. The PRU is a basic unit for resource allocation and includes a plurality of contiguous OFDM symbols in a time domain and a plurality of contiguous subcarriers in a frequency domain. For example, the number of OFDM symbols in the PRU may be equal to the number of OFDM symbols included in the subframe. Accordingly, the number of OFDM symbols in the PRU may be determined according to the type of the subframe. The number of subcarriers in the PRU may be 18. In this case, the PRU may include 6 OFDM symbols×18 subcarriers. The PRU may be referred to as a Distributed Resource Unit (DRU) or a Contiguous Resource unit (CRU) according to a resource allocation unit.

The above-described structure is merely exemplary. Accordingly, the length of the super frame, the number of frames included in the super frame, the number of subframes included in the frame, the number of OFDMA symbols included in the subframe and the parameter of the OFDMA symbol may be variously changed. For example, the number of subframes included in the frame may be variously changed according to channel bandwidth and CP length.

Figure 4:
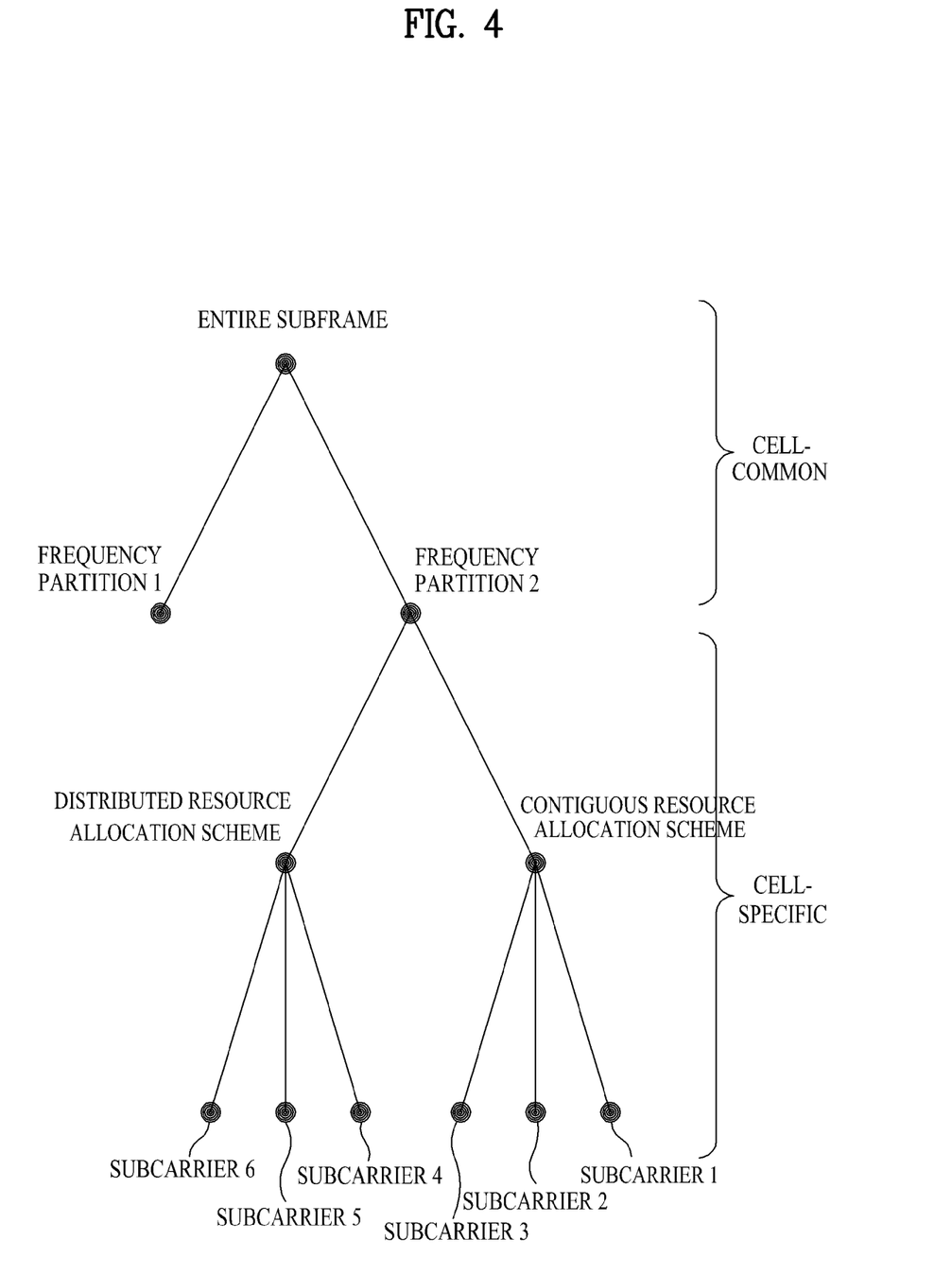
FIG. 4 is a diagram showing an example of a physical structure of a subframe in an IEEE 802.16m system.

FIG. 4 is a diagram showing an example of a physical structure of a subframe in an IEEE 802.16m system.

Referring to FIG. 4, the subframe may be divided into at least one frequency partition (FP). Although the subframe is divided into two FPs in FIG. 4, the number of FPs is not limited thereto.

Each FP includes one or more PRUs. A distributed resource allocation scheme and/or a contiguous resource allocation scheme may be applied to each FP.

A logical resource unit (LRU) is a basic logical unit for a distributed resource allocation scheme and a contiguous resource allocation scheme. A logical distributed resource unit (LDRU) includes a plurality of subcarriers distributed in a frequency band. The size of the LDRU is equal to the size of the PRU. The LDRU is also referred to as a distributed LRU (DLRU). A logical contiguous resource unit (LCRU) includes contiguous subcarriers. The size of the LCRU is equal to the size of the PRU. The LCRU is also referred to as a contiguous LRU (CLRU).

Figure 5:
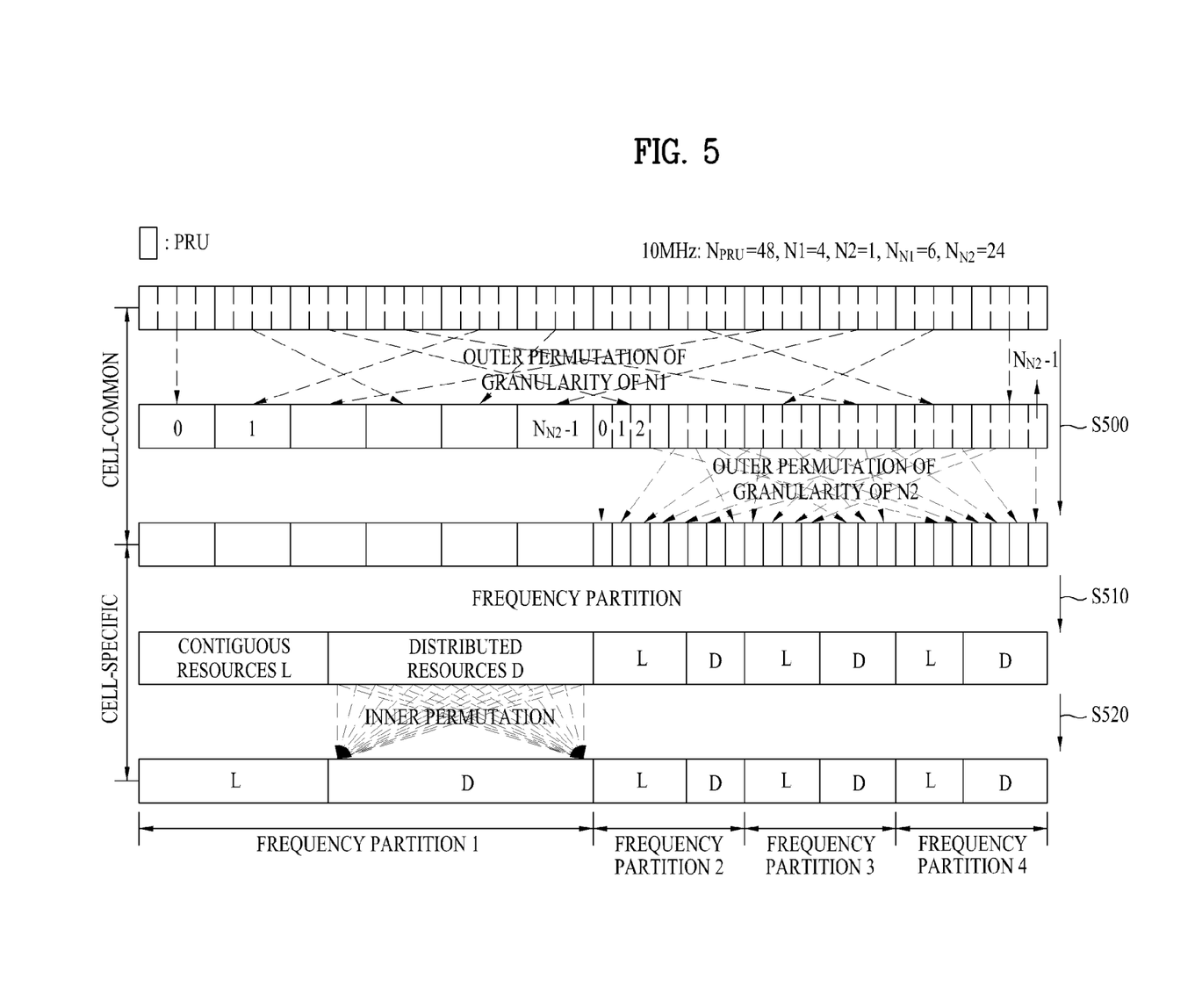
FIG. 5 is a diagram showing a process of mapping resource units in an IEEE 802.16m system.

FIG. 5 is a diagram showing a process of mapping resource units in an IEEE 802.16m system. In particular, in FIG. 5, for convenience of description, an entire frequency band is 10 MHz, a total number of PRUs is 48, $N_1$=4, the number $N_{N1}$ of subbands having granularity of $N_1$ is 6, $N_2$=1 and the number $N_{N2}$ of subbands having granularity of $N_2$ is 24.

Referring to FIG. 5, a PRU of a physical region is divided into subband PRUs or miniband PRUs which are logical regions through outer permutation of granularity of $N_1$, and outer permutation is performed with granularity of $N_2$ with respect to the minband PRUs (S500). That is, outer permutation of S500 may be divided into a subband partitioning step of partitioning the PRUs of the physical region into subband PRUs and miniband PRUs which are logical regions and a miniband permutation step of acquiring diversity gain of the minband PRUs.

A process of distributing the subband PRUs or the miniband PRUs into FPs and dividing contiguous resources L and Distributed resources in FPs is performed (S510). The process of distributing the subband PRUs or the miniband PRUs to FPs may be performed in a state of being included in or separately from the outer permutation process of step S500. If the process of distributing the subband PRUs or the miniband PRUs separately from the outer permutation process, it may be performed based on FP information broadcast through the super frame header or a separate distribution rule.

In order to obtain diversity gain with respect to distributed resources, inner permutation is additionally performed (S520). Here, the inner permutation process is performed in units of subcarrier pairs and is referred to as subcarrier permutation.

Hereinafter, a method of partitioning subbands according to an embodiment of the present invention will be described.

Since the subbands need to be suitable for frequency selective allocation, a contiguous PRU allocation scheme of a frequency domain is applied. Since minibans need to be suitable for acquisition of frequency diversity gain, the minibands are mixed and set in the frequency domain.

If the number of subbands used in one cell is $K_{SB}$ and the number PRUs allocated to subbands is $L_{SB}$, $L_{SB}$ has a value of $N_1 * K_{SB}$. Here, $K_{SB}$ may be signaled through a subband allocation count (SAC) field which is 5-bit information and the SAC may be transmitted to a terminal through a broadcast channel. $K_{SB}$ may be signaled through a downlink subband allocation count (DSAC) field which is 3-bit or 5-bit information based on a system bandwidth, and the DSAC may be transmitted to the terminal through the super frame header.

The remaining resources except for resources allocated to subbands among all physical resources are allocated to minibands. If the number of minibands used in one cell is $K_{MB}$ and the number of PRUs allocated to the minibands is $L_{MB}$, $L_{MB}$ has a value of $N_2 * K_{MB}$. The total number of PRUs is $L_{SB} + L_{MB}$ and the maximum number $N_{sub}$ of allocable subbands is $\lfloor N_{PRU}/N_1 \rfloor$.

Table 2 shows a mapping relation between the DSAC and $K_{SB}$ in the case where a system bandwidth is 20 MHz or 10 MHz.

TABLE 2

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | N.A. |
| 23 | N.A. |
| 24 | N.A. |
| 25 | N.A. |
| 26 | N.A. |
| 27 | N.A. |
| 28 | N.A. |
| 29 | N.A. |
| 30 | N.A. |
| 31 | N.A. |

Tables 3 and 4 show a mapping relation between DSAC and $K_{SB}$ in the case where system bandwidth is 10 MHz and 5 MHz.

TABLE 3

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | N.A. |
| 11 | N.A. |
| 12 | N.A. |
| 13 | N.A. |

TABLE 3-continued

| DSAC | # of subbands allocated ($K_{SB}$) |
|---|---|
| 14 | N.A. |
| 15 | N.A. |

TABLE 4

| DSAC | # of subbands allocated ($K_{SB}$) |
|---|---|
| 0 | 0 |
| 1 | 1 |
| 2 | 2 |
| 3 | 3 |
| 4 | N.A. |
| 5 | N.A. |
| 6 | N.A. |
| 7 | N.A. |

As described above, PRUs which are physical resources are divided into subband PRUs and miniband PRUs, which are respectively denoted by $PRU_{MB}$ and $PRU_{MB}$. A $PRU_{MB}$ set is indexed with 0 to $L_{SB}-1$. Similarly, a $PRU_{MB}$ set is indexed with 0 to $L_{MB}-1$.

Generally, Equation 1 is used to map PRU to $PRU_{SB}$, and Equation 2 is used to map PRU to $PRU_{MB}$.

$$PRU_{SB}[j] = PRU[i], j = 0, 1, \ldots, L_{SB} - 1 \quad \text{Equation 1}$$
where,
$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/K_{SB} \rceil)}{N_{sub}} \right\rfloor \right\} \bmod \{N_{sub}\} + \{j\} \bmod \{N_1\}$$

$$PRU_{MB}[k] = PRU[i], k = 0, 1, \ldots, L_{MB} - 1 \quad \text{Equation 2}$$
where,
$$i = \begin{cases} N_1 \cdot \left\{ \left\lceil \frac{N_{sub}}{K_{SB}} \right\rceil \cdot \left\lfloor \frac{k+L_{SB}}{N_1} \right\rfloor + \left\lfloor \left\lfloor \frac{k+L_{SB}}{N_1} \right\rfloor \cdot \frac{GCD(N_{sub}, \lceil N_{sub}/K_{SB} \rceil)}{N_{sub}} \right\rfloor \right\} \bmod \{N_{sub}\} + \{k+L_{SB}\} \bmod \{N_1\} & K_{SB} > 0 \\ k & K_{SB} = 0 \end{cases}$$

In Equations 1 and 2, GCD(a, b) denotes a greatest common divisor of a and b, $\lceil x \rceil$ denotes a ceiling of x, $\lfloor y \rfloor$ denotes a floor of y. In addition, x mod y denotes a modulo operation of x and y.

Figure 6:
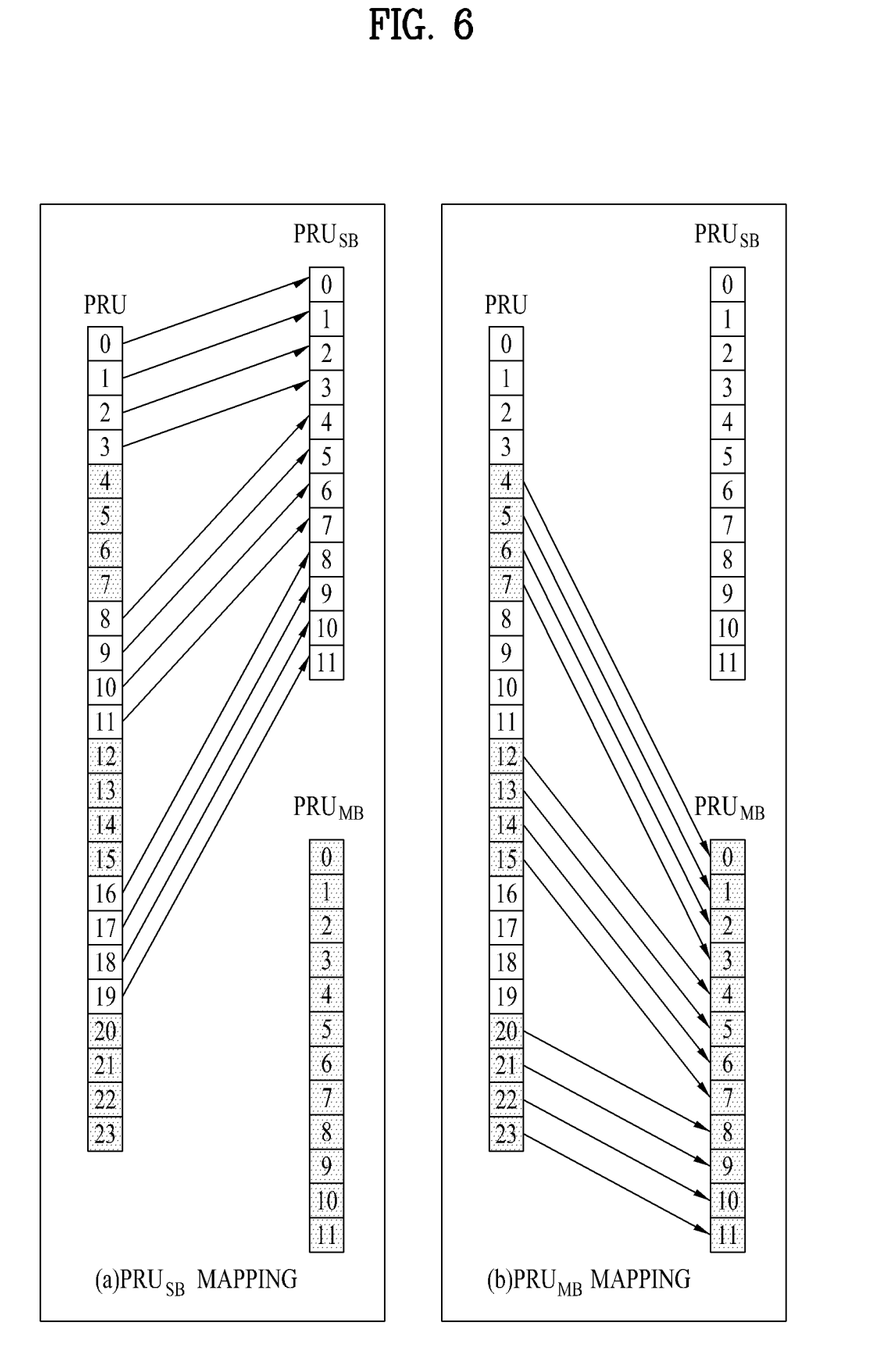
FIG. 6 is a diagram showing a general method of partitioning subbands in an IEEE 802.16m system.

FIG. 6 is a diagram showing a general method of partitioning subbands in an IEEE 802.16m system, that is, an example of partitioning 24 PRUs into $PRU_{MB}$ and $PRU_{MB}$ according to Equation 1 and Equation 2. In particular, in FIG. 6, a system bandwidth is 5 MHz, $N_{PRU}$ is 24, $N_1$ is 4, $N_2$ is 1, and $K_{SB}$ is 3.

As shown in FIG. 6(a), $PRU_{SB}$ includes three subbands, that is, a total of 12 PRUs, by Equation 1 and, as shown in FIG. 6(b), $PRU_{MB}$ includes 12 minibands by Equation 2. Thereafter, $PRU_{MB}$ is subjected to miniband permutation in order to acquire diversity gain and permutated $PRU_{MB}$ is referred to as $PPRU_{MB}$.

If the number of allocated subbands, that is, $K_{SB}$, is decreased, the number of minibands is increased. Referring to Equations 1 and 2, it can be seen that a term $$\left\lceil \frac{N_{sub}}{K_{SB}} \right\rceil$$

is a factor for determining a gap between subbands.

Accordingly, if subbands are partitioned according to a conventional method and $K_{SB}$ is less than or equal to a specific value, the gap between the subbands is excessively increased and thus the gap between the minibands is decreased. Accordingly, it is difficult to acquire diversity gain when miniband permutation and subcarrier permutation is subsequently performed.

In order to solve such a problem, the present invention proposes including a factor for limiting the gap between the subbands to a specific number of PRUs or less in Equations 1 and 2. Accordingly, as the embodiment of the present invention, Equations 1 and 2 may be changed to Equations 3 and 4.

$$\min\left(\left\lceil \frac{N_{sub}}{K_{SB}} \right\rceil, \frac{N_{sub}}{3}\right) \text{ or } \left\lceil \frac{N_{sub}}{\max(K_{SB}, 3)} \right\rceil.$$

Equations 5 and 6 show the case where a term $$\left\lceil \frac{N_{sub}}{K_{SB}} \right\rceil$$

is changed to $$\min\left(\left\lceil \frac{N_{sub}}{K_{SB}} \right\rceil, \frac{N_{sub}}{4}\right) \text{ or } \left\lceil \frac{N_{sub}}{\max(K_{SB}, 4)} \right\rceil$$

in order to limit the gap between the subbands.

Equation 3

$$PRU_{SB}[j] = PRU[i], \; j = 0, 1, \ldots, L_{SB} - 1$$
where,
$$i = N_1 \cdot \left\{ \min\left(\left\lceil \frac{N_{sub}}{K_{SB}} \right\rceil, \frac{N_{sub}}{3}\right) \cdot \left\lfloor \frac{j}{N_1} \right\rfloor + \left\lfloor \frac{j}{N_1} \right\rfloor \cdot \frac{GCD(N_{sub}, \min(\lceil N_{sub}/K_{SB} \rceil, N_{sub}/3))}{N_{sub}} \right\} \bmod \{N_{sub}\} + \{j\} \bmod \{N_1\}$$
$$= N_1 \cdot \left\{ \left\lceil \frac{N_{sub}}{\max(K_{SB}, 3)} \right\rceil \cdot \left\lfloor \frac{j}{N_1} \right\rfloor + \left\lfloor \frac{j}{N_1} \right\rfloor \cdot \frac{GCD(N_{sub}, \lceil N_{sub}/\max(K_{SB}, 3) \rceil)}{N_{sub}} \right\} \bmod \{N_{sub}\} + \{j\} \bmod \{N_1\}$$

Equation 4

$$PRU_{MB}[k] = PRU[i], \; k = 0, 1, \ldots, L_{MB} - 1$$
where,
$$i = \begin{cases} N_1 \cdot \left\{ \min\left(\left\lceil \frac{N_{sub}}{K_{SB}} \right\rceil, \frac{N_{sub}}{3}\right) \cdot \left\lfloor \frac{k + L_{SB}}{N_1} \right\rfloor + \left\lfloor \frac{k + L_{SB}}{N_1} \right\rfloor \cdot \frac{GCD(N_{sub}, \min(\lceil N_{sub}/K_{SB} \rceil, N_{sub}/3))}{N_{sub}} \right\} \bmod \{N_{sub}\} + \{k + L_{SB}\} \bmod \{N_1\} & K_{SB} > 0 \\ = N_1 \cdot \left\{ \left\lceil \frac{N_{sub}}{\max(K_{SB}, 3)} \right\rceil \cdot \left\lfloor \frac{k + L_{SB}}{N_1} \right\rfloor + \left\lfloor \frac{k + L_{SB}}{N_1} \right\rfloor \cdot \frac{GCD(N_{sub}, \lceil N_{sub}/\max(K_{SB}, 3) \rceil)}{N_{sub}} \right\} \bmod \{N_{sub}\} + \{k + L_{SB}\} \bmod \{N_1\} & \\ k & K_{SB} = 0 \end{cases}$$

In Equations 3 and 4, in order to limit the gap between the subbands, a term $$\left\lceil \frac{N_{sub}}{K_{SB}} \right\rceil$$

is changed to

Equation 5

$$PRU_{SB}[j] = PRU[i], \; j = 0, 1, \ldots, L_{SB} - 1$$
where,
$$i = N_1 \cdot \left\{ \min\left(\left\lceil \frac{N_{sub}}{K_{SB}} \right\rceil, \frac{N_{sub}}{4}\right) \cdot \left\lfloor \frac{j}{N_1} \right\rfloor + \left\lfloor \frac{j}{N_1} \right\rfloor \cdot \frac{GCD(N_{sub}, \min(\lceil N_{sub}/K_{SB} \rceil, N_{sub}/4))}{N_{sub}} \right\} \bmod \{N_{sub}\} + \{j\} \bmod \{N_1\}$$
$$= N_1 \cdot \left\{ \left\lceil \frac{N_{sub}}{\max(K_{SB}, 4)} \right\rceil \cdot \left\lfloor \frac{j}{N_1} \right\rfloor + \left\lfloor \frac{j}{N_1} \right\rfloor \cdot \frac{GCD(N_{sub}, \lceil N_{sub}/\max(K_{SB}, 4) \rceil)}{N_{sub}} \right\} \bmod \{N_{sub}\} + \{j\} \bmod \{N_1\}$$

Equation 6

$$PRU_{MB}[k] = PRU[i], \; k = 0, 1, \ldots, L_{MB} - 1$$
where,
$$i = \begin{cases} N_1 \cdot \left\{ \min\left(\left\lceil \frac{N_{sub}}{K_{SB}} \right\rceil, \frac{N_{sub}}{4}\right) \cdot \left\lfloor \frac{k + L_{SB}}{N_1} \right\rfloor + \left\lfloor \frac{k + L_{SB}}{N_1} \right\rfloor \cdot \frac{GCD(N_{sub}, \min(\lceil N_{sub}/K_{SB} \rceil, N_{sub}/4))}{N_{sub}} \right\} \bmod \{N_{sub}\} + \{k + L_{SB}\} \bmod \{N_1\} & K_{SB} > 0 \\ = N_1 \cdot \left\{ \left\lceil \frac{N_{sub}}{\max(K_{SB}, 4)} \right\rceil \cdot \left\lfloor \frac{k + L_{SB}}{N_1} \right\rfloor + \left\lfloor \frac{k + L_{SB}}{N_1} \right\rfloor \cdot \frac{GCD(N_{sub}, \lceil N_{sub}/\max(K_{SB}, 4) \rceil)}{N_{sub}} \right\} \bmod \{N_{sub}\} + \{k + L_{SB}\} \bmod \{N_1\} & \\ k & K_{SB} = 0 \end{cases}$$

It is apparent to those skilled in the art that a value X of $$\min\left(\left\lceil \frac{N_{sub}}{K_{SB}} \right\rceil, \frac{N_{sub}}{X}\right) \text{ or } \left\lceil \frac{N_{sub}}{\max(K_{SB}, X)} \right\rceil$$

described in Equations 3 and 4 may be 3 or 4 or may be changed by a system bandwidth, $N_{PRU}$, $N_1$, $N_2$, etc.

Figure 7:
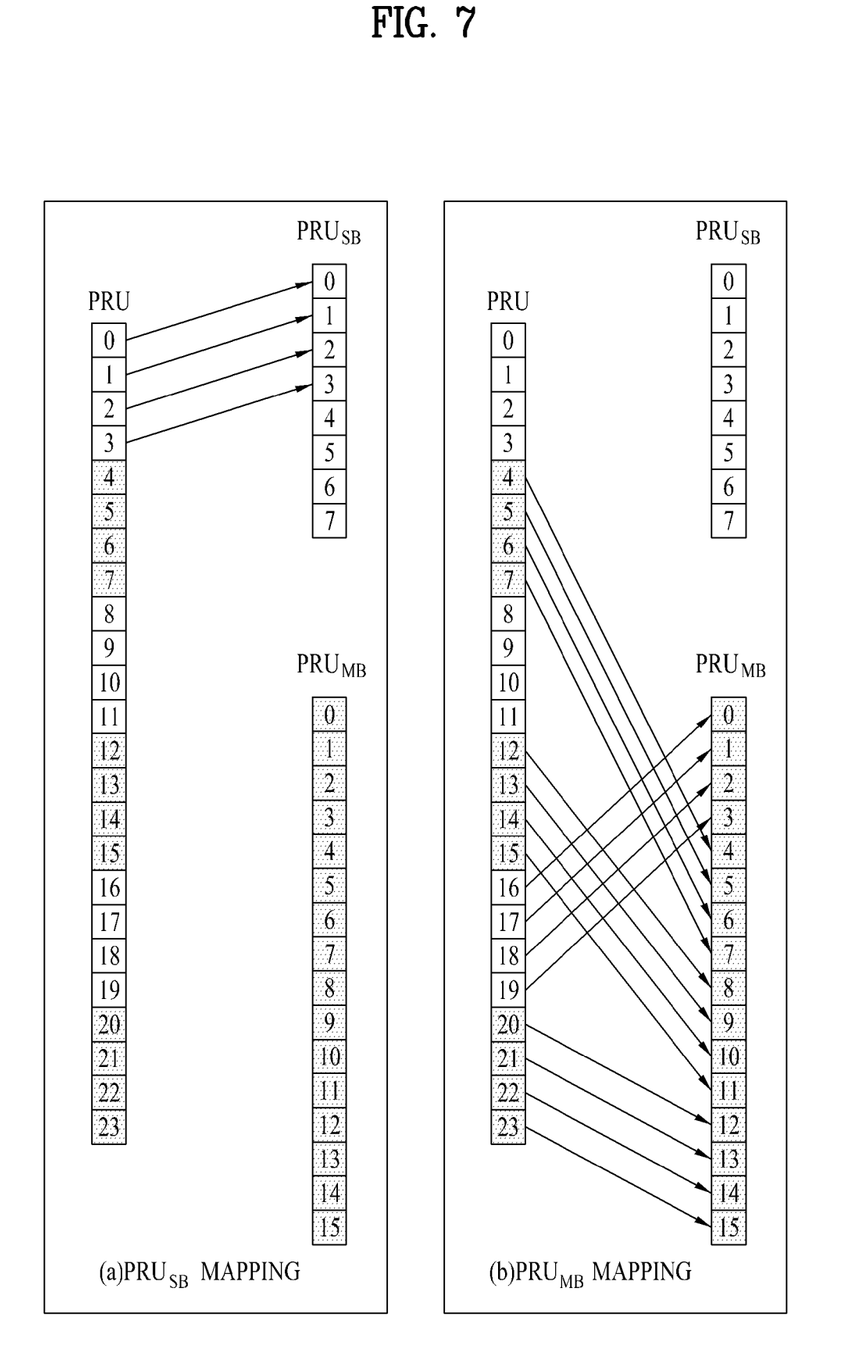
FIG. 7 is a diagram showing a method of partitioning subbands according to an embodiment of the present invention in an IEEE 802.16m system.

FIG. 7 shows an example of partitioning 24 PRUs into $PUR_{SB}$ and $PRU_{MB}$ according to a method of partitioning subbands of an embodiment of the present invention in an IEEE 802.16m system. In particular, in FIG. 7, a system bandwidth is 5 MHz, $N_{PRU}$ is 24, $N_1$ is 4, $N_2$ is 1, $K_{SB}$ is 2, and a term $$\left\lceil \frac{N_{sub}}{K_{SB}} \right\rceil$$

of Equations 1 and 2 is changed to $$\min\left(\left\lceil \frac{N_{sub}}{K_{SB}} \right\rceil, \frac{N_{sub}}{4}\right) \text{ or } \left\lceil \frac{N_{sub}}{\max(K_{SB}, 4)} \right\rceil$$

like Equations 5 and 6.

As shown in FIG. 7(a), $PRU_{SB}$ includes two subbands, that is, a total of eight PRUs by Equation 5. As shown in FIG. 7(b), $PRU_{MB}$ includes 16 minibands by Equation 6. The gap between the subbands includes four PRUs at minimum.

Figure 8:
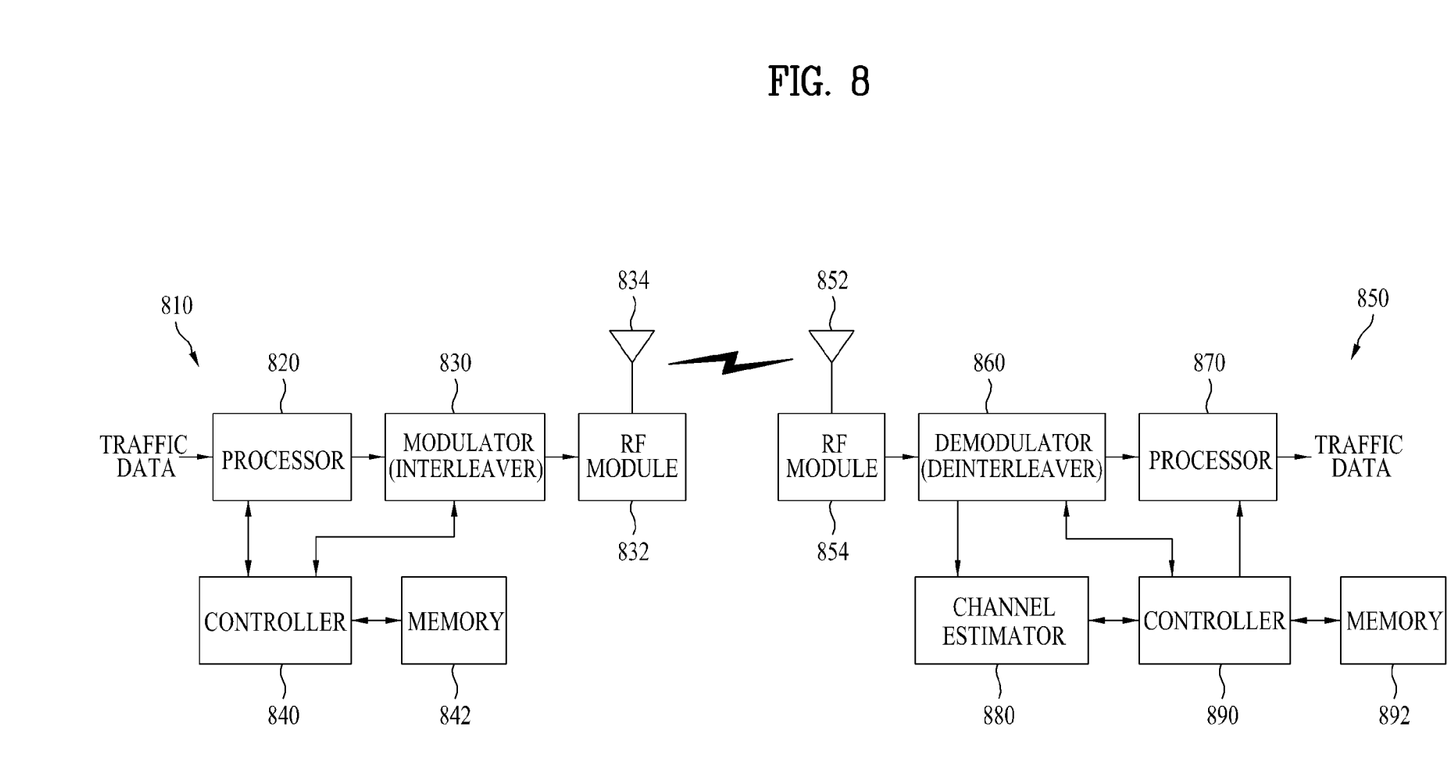
FIG. 8 is a block diagram showing a transmitter and a receiver according to an embodiment of the present invention.

FIG. 8 is a block diagram showing a transmitter and a receiver according to an embodiment of the present invention. In downlink, the transmitter 810 is a part of a base station and the receiver 850 is a part of a terminal. In the uplink, the transmitter 810 is a part of a terminal and the receiver 850 is a part of a base station.

In the transmitter 810, a processor 820 encodes, interleaves and maps data (e.g., traffic data and signaling) to symbols so as to generate data symbols. In addition, the processor 820 generates pilot symbols and multiplexes the data symbols and the pilot symbols.

A modulator 830 generates transport symbols according to a radio access scheme. The radio access scheme includes FDMA, TDMA, CDMA, SC-FDMA, MC-FDMA, OFDMA or a combination thereof. The modulator 830 enables data to be distributed and transmitted in a frequency domain using various permutation methods described in the embodiment of the present invention. A radio frequency (RF) module 832 performs processes (e.g., analog conversion, amplification, filtering and frequency up-conversion) with respect to the transport symbols and generates an RF signal transmitted through an antenna 834.

In the receiver 850, an antenna 852 receives a signal from the transmitter 810 and provides the signal to an RF module 854. The RF module 854 performs processes (e.g., filtering, amplification, frequency down-conversion, and digitalization) with respect to the received signal and provides input samples.

A demodulator 860 demodulates the input samples and provides data values and pilot values. A channel estimator 880 obtains a channel estimate value based on the received pilot values. The demodulator 860 performs data detection (or equalization) with respect to the received data values using the channel estimate value and provides data symbol estimate values for the transmitter 810. In addition, the demodulator 860 performs inverse operations of various permutation methods described in the embodiment of the present invention and realigns the data distributed in the frequency domain and the time domain in original order. The processor 870 symbol-demaps, deinterleaves and decodes the data symbol estimate values and provides the decoded data.

In general, the processes of the demodulator 860 and the processor 870 in the receiver 850 are complementary to the processes of the modulator 830 and the processor 820 in the transmitter 810.

The controllers 840 and 890 supervise and control the operations of various processing modules of the transmitter 810 and the receiver 850, respectively. Memories 842 and 892 store program code and data for the transmitter 810 and the receiver, respectively.

The modules shown in FIG. 8 are merely exemplary and the transmitter and/or the receiver may further include necessary modules, some modules/functions may be omitted or separated into different modules, and two or more modules may be combined into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of other embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations described above. Software code may be stored in a memory unit and then may be driven by a processor. The memory unit may be located inside or outside the processor to transmit and receive data to and from the processor through various well known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system. In particular, the present invention is applicable to a wireless mobile communication apparatus used for a cellular system.

The invention claimed is:

1. A method for mapping a system frequency band to subbands and minibands at a base station in a wireless communication system, the method comprising:
    dividing the system band frequency into a plurality of physical resource units (PRUs);
    mapping the plurality of PRUs to physical resource units of a subband $PRU_{SB}$ in accordance with a first rule;
    mapping the plurality of physical resource units to physical resource units of a miniband $PRU_{MB}$ in accordance with a second rule,
    wherein the first rule and the second rule contain factors for limiting a maximum value of a gap between subbands allocated to the system frequency band,
    wherein the first rule is $PRU_{SB}[j]=PRU[i]$, $j=0, 1, \ldots, L_{SB}-1$, where i is $$N_1 \cdot \left\{ \left\lceil \frac{N_{sub}}{\max(K_{SB}, x)} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/\max(K_{SB}, x) \rceil)}{N_{sub}} \right\rfloor \right\} \mod\{N_{sub}\} + \{j\}\mod\{N_1\}$$

(where, $N_1$ denotes the number of physical resource units configuring one subband, $N_{sub}$ denotes a maximum number of subbands, $K_{SB}$ denotes the number of subbands to be allocated, $GCD(N_{sub}, \lceil N_{sub}/\max(K_{SB}, x) \rceil)$ denotes a greatest common divisor of $N_{sub}$ and $\lceil N_{sub}/\max(K_{SB}, x) \rceil$, and x denotes a factor for limiting a maximum value of a gap between subbands).

2. The method according to claim 1, wherein the second rule is $PRU_{MB}[k]=PRU[i]$, $k=0, 1, \ldots, L_{MB}-1$, where i is $$\begin{cases} N_1 \cdot \left\{ \left\lceil \frac{N_{sub}}{\max(K_{SB}, x)} \right\rceil \cdot \left\lfloor \frac{k+L_{SB}}{N_1} \right\rfloor + \left\lfloor \left\lfloor \frac{k+L_{SB}}{N_1} \right\rfloor \cdot \frac{GCD(N_{sub}, \lceil N_{sub}/\max(K_{SB}, x) \rceil)}{N_{sub}} \right\rfloor \right\} \mod\{N_{sub}\} + \{k+L_{SB}\}\mod\{N_1\} & K_{SB} > 0 \\ k & K_{SB} = 0 \end{cases}$$

(where, $N_1$ denotes the number of physical resource units configuring one subband, $N_{sub}$ denotes a maximum number of subbands, $K_{SB}$ denotes the number of subbands to be allocated, $GCD(N_{sub}, \lceil N_{sub}/\max(K_{SB}, x) \rceil)$ denotes a greatest common divisor of $N_{sub}$ and $\lceil N_{sub}/\max(K_{SB}, x) \rceil$, x denotes a factor for limiting a maximum value of a gap between subbands, and $L_{SB}$ denotes the number of physical resource units included in allocated subbands).

3. The method according to claim 2, wherein the factor x for limiting the maximum value of the gap between the subbands is 3 or 4.

4. The method according to claim 2, wherein:
    the number $K_{SB}$ of subbands to be allocated is included in a downlink subband allocation count (DSAC) field, and
    the downlink subband allocation count field is broadcast through a super frame header.

5. The method according to claim 1, wherein the factor x for limiting the maximum value of the gap between the subbands is 3 or 4.

6. The method according to claim 2, wherein:
    the number $K_{SB}$ of subbands to be allocated is included in a downlink subband allocation count (DSAC) field, and
    the downlink subband allocation count field is broadcast through a super frame header.

7. The method according to claim 1, further comprising performing permutation with respect to the mapped physical resource units $PRU_{MP}$ of the subband.

8. A base station apparatus comprising:
    a processor configured to divide the system band frequency into a plurality of physical resource units (PRUs), map the plurality of PRUs to physical resource units of a subband $PRU_{SB}$ in accordance with a first rule, and map the plurality of physical resource units to physical resource units of a miniband $PRU_{MB}$ in accordance with a second rule; and
    a transmission module configured to transmit a downlink signal to a terminal using the physical resource units of the subband and the physical resource units of the miniband,
    wherein the first rule and the second rule contain factors for limiting a maximum value of a gap between subbands allocated to the system frequency band,
    wherein the first rule is $PRU_{SB}[j]=PRU[i]$, $j=0, 1, \ldots, L_{SB}-1$,
    where i is $$N_1 \cdot \left\{ \left\lceil \frac{N_{sub}}{\max(K_{SB}, x)} \right\rceil \cdot \left\lfloor \frac{j}{N_1} \right\rfloor + \left\lfloor \left\lfloor \frac{j}{N_1} \right\rfloor \cdot \frac{GCD(N_{sub}, \lceil N_{sub}/\max(K_{SB}, x) \rceil)}{N_{sub}} \right\rfloor \right\} \mod\{N_{sub}\} + \{j\}\mod\{N_1\}$$

(where, $N_1$ denotes the number of physical resource units configuring one subband, $N_{sub}$ denotes a maximum number of subbands, $K_{SB}$ denotes the number of subbands to be allocated, $GCD(N_{sub}, \lceil N_{sub}/\max(K_{SB}, x) \rceil)$ denotes a greatest common divisor of $N_{sub}$ and $\lceil N_{sub}/\max(K_{SB}, x) \rceil$, and x denotes a factor for limiting a maximum value of a gap between subbands).

9. The base station apparatus according to claim 8, wherein the second rule is $PRU_{MB}[k]=PRU[i]$, $k=0, 1, \ldots, L_{MB}-1$, where i is $$\begin{cases} N_1 \cdot \left\{ \left\lceil \frac{N_{sub}}{\max(K_{SB}, x)} \right\rceil \cdot \left\lfloor \frac{k + L_{SB}}{N_1} \right\rfloor + \left\lfloor \left\lfloor \frac{k + L_{SB}}{N_1} \right\rfloor \cdot \frac{GCD(N_{sub}, \lceil N_{sub}/\max(K_{SB}, x) \rceil)}{N_{sub}} \right\rfloor \right\} \bmod\{N_{sub}\} + \{k + L_{SB}\} \bmod\{N_1\} & K_{SB} > 0 \\ k & K_{SB} = 0 \end{cases}$$

(where, $N_1$ denotes the number of physical resource units configuring one subband, $N_{sub}$ denotes a maximum number of subbands, $K_{SB}$ denotes the number of subbands to be allocated, $GCD(N_{sub}, \lceil N_{sub}/\max(K_{SB}, x) \rceil)$ denotes a greatest common divisor of $N_{sub}$ and $\lceil N_{sub}/\max(K_{SB}, x) \rceil$, x denotes a factor for limiting a maximum value of a gap between subbands, and $L_{SB}$ denotes the number of physical resource units included in allocated subbands).

10. The base station apparatus according to claim 9, wherein the factor x for limiting the maximum value of the gap between the subbands is 3 or 4.

11. The base station apparatus according to claim 9, wherein:
the number $K_{SB}$ of subbands to be allocated is included in a downlink subband allocation count (DSAC) field, and
the downlink subband allocation count field is broadcast through a super frame header.

12. The base station apparatus according to claim 8, wherein the factor x for limiting the maximum value of the gap between the subbands is 3 or 4.

13. The base station apparatus according to claim 8, wherein:
the number $K_{SB}$ of subbands to be allocated is included in a downlink subband allocation count (DSAC) field, and
the downlink subband allocation count field is broadcast through a super frame header.

14. The base station apparatus according to claim 8, wherein the processor performs permutation with respect to the mapped physical resource units $PRU_{MP}$ of the subband.

* * * * *